(12) United States Patent
Shibuya et al.

(10) Patent No.: US 7,310,611 B2
(45) Date of Patent: Dec. 18, 2007

(54) ORDER PROCESSING SYSTEM AND METHOD

(75) Inventors: Akio Shibuya, Shinagawa (JP); Yuki Watabe, Sapporo (JP)

(73) Assignee: Nifty Corporation, Tokyo (JP)

( * ) Notice: Subject to any disclaimer, the term of this patent is extended or adjusted under 35 U.S.C. 154(b) by 0 days.

(21) Appl. No.: 10/292,840

(22) Filed: Nov. 13, 2002

(65) Prior Publication Data

US 2003/0061120 A1 Mar. 27, 2003

Related U.S. Application Data

(63) Continuation of application No. PCT/JP01/03921, filed on May 11, 2001, now abandoned.

(30) Foreign Application Priority Data

| May 15, 2000 | (JP) | ............................... 2000-141088 |
| May 15, 2000 | (JP) | ............................... 2000-141105 |

(51) Int. Cl.
*G06Q 30/00* (2006.01)
(52) U.S. Cl. ........................................................ 705/26
(58) Field of Classification Search .................. 705/26, 705/28
See application file for complete search history.

(56) References Cited

U.S. PATENT DOCUMENTS

| 5,539,825 | A |   | 7/1996  | Akiyama et al. |        |
| 5,671,279 | A |   | 9/1997  | Elgamal        |        |
| 5,839,119 | A |   | 11/1998 | Krsul et al.   |        |
| 5,898,777 | A | * | 4/1999  | Tycksen et al. | 705/53 |
| 5,961,601 | A |   | 10/1999 | Iyengar        |        |

(Continued)

FOREIGN PATENT DOCUMENTS

| EP | 0 855 687 |   | 7/1998  |
| EP | 0 915 590 |   | 5/1999  |
| EP | 0915590   | * | 12/1999 |

(Continued)

OTHER PUBLICATIONS

Nikkei Multimedia, No. 41, pp. 146 to 149, Nov. 15, 1998 (with English abstract).

(Continued)

*Primary Examiner*—Florian Zeender
*Assistant Examiner*—O. Garcia Ade
(74) *Attorney, Agent, or Firm*—Staas & Halsey LLP

(57) ABSTRACT

A novel order processing in a shop side computer that carries out online sales of goods and the like is realized by this invention. In the shop side computer, upon receiving an order request from a customer terminal, content information of the customer order is registered, and an identification number of the customer order and a shop code are transmitted to a settlement system. Next, upon receiving the identification number of the customer order and an operation key from the settlement system, the content information of the customer order is read out according to the identification number of the customer order, and the content information of the customer order, the operation key, and the shop authentication information are transmitted to the settlement system. After that, upon receiving information indicating that the acceptance of the customer order is possible from the settlement system, information indicating the acceptance of the order is stored for the customer order. Then, at an arbitrary timing after the shipment of the commodity and the like relating to the customer order, the identification number of the customer order relating to an order price claim request is transmitted to the settlement system, and information indicating whether or not the order price claim processing succeeded is received from the settlement system.

11 Claims, 8 Drawing Sheets

U.S. PATENT DOCUMENTS

| | | | |
|---|---|---|---|
| 6,029,150 A | 2/2000 | Kravitz | |
| 6,141,753 A | 10/2000 | Zhao et al. | |
| 6,148,405 A * | 11/2000 | Liao et al. | 726/2 |
| 6,269,445 B1 | 7/2001 | Nishioka et al. | |
| 6,314,425 B1 * | 11/2001 | Serbinis et al. | 705/26 |
| 6,317,729 B1 * | 11/2001 | Camp et al. | 705/79 |
| 6,336,095 B1 * | 1/2002 | Rosen | 705/26 |
| 6,343,284 B1 | 1/2002 | Ishikawa et al. | |
| 6,363,365 B1 * | 3/2002 | Kou | 705/26 |
| 6,701,303 B1 | 3/2004 | Dunn et al. | |
| 6,738,749 B1 * | 5/2004 | Chasko | 705/17 |
| 6,738,789 B2 * | 5/2004 | Multer et al. | 707/201 |
| 6,741,970 B2 * | 5/2004 | Smith et al. | 705/26 |
| 6,820,125 B1 | 11/2004 | Dias et al. | |
| 2002/0178354 A1 | 11/2002 | Ogg et al. | |
| 2003/0088784 A1 * | 5/2003 | Ginter et al. | 713/189 |

FOREIGN PATENT DOCUMENTS

| | | |
|---|---|---|
| JP | 2-187859 | 7/1990 |
| JP | 8-096034 | 4/1996 |
| JP | 8-235115 | 9/1996 |
| JP | 9-114891 | 5/1997 |
| JP | 09/251494 | 9/1997 |
| JP | 10-091682 | 4/1998 |
| JP | 10-105603 | 4/1998 |
| JP | 10/207963 | 8/1998 |
| JP | 10-240814 | 9/1998 |
| JP | 10-261021 | 9/1998 |
| JP | 10-320646 | 12/1998 |
| JP | 11-120241 | 4/1999 |
| JP | 11-134401 | 5/1999 |
| JP | 2000-76336 | 3/2000 |
| WO | WO 98/40809 | 9/1998 |
| WO | WO 00/01108 | 1/2000 |

OTHER PUBLICATIONS

USPTO Office Action mailed Aug. 22, 2006 in related Application No. 10/292,510.

Japanese Office Action dated Sep. 27, 2005 of Applicaion No. 2001-142719.

Japanese Office Action dated Sep. 27, 2005 of Application No. 2001-142668.

Japanese Office Action dated Sep. 27, 2005 of Application No. 2001-142681.

Japanese Office Action dated Sep. 27, 2005 of Application No. 2001-142698.

* cited by examiner

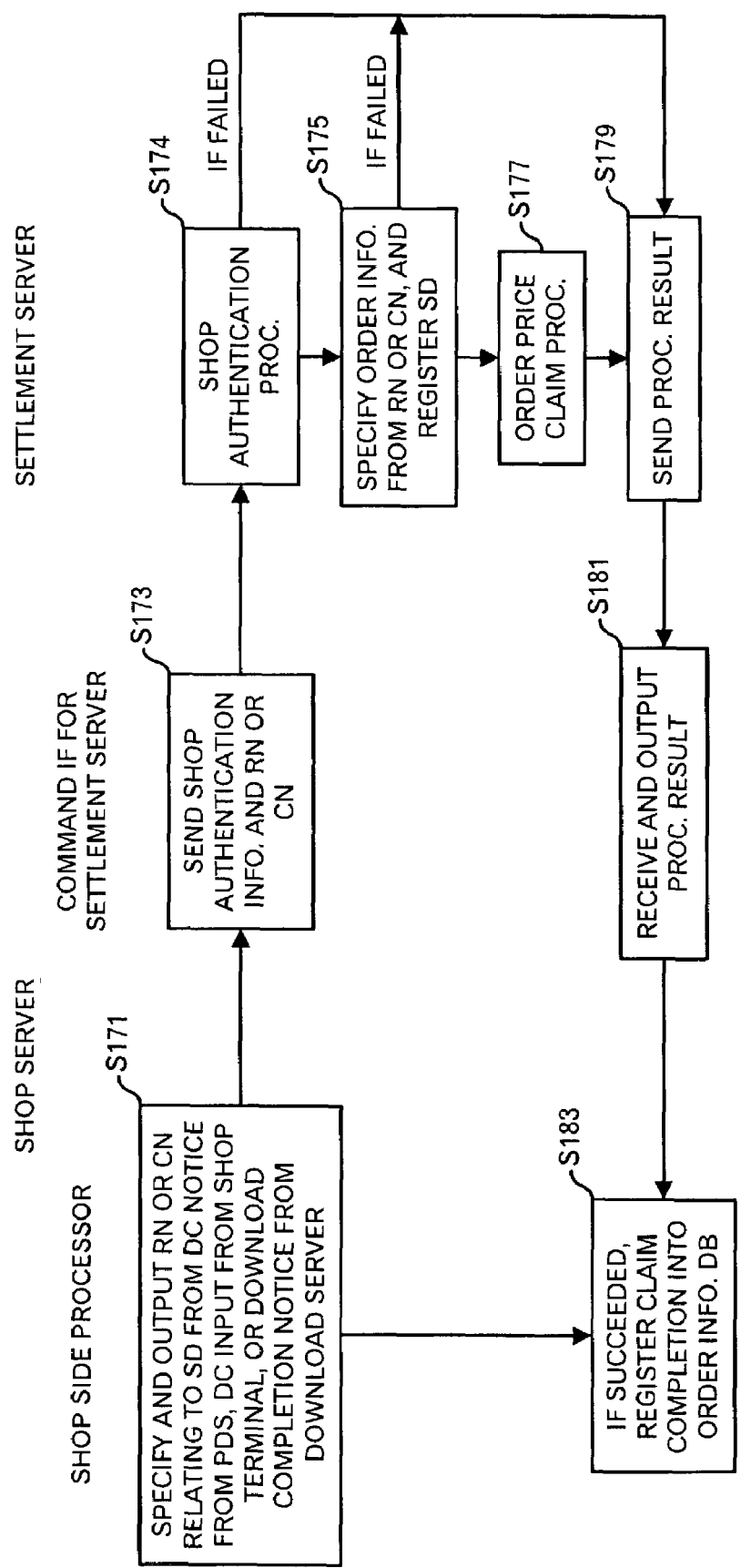

ORDER PROCESSING SYSTEM AND METHOD

CROSS-REFERENCE TO RELATED APPLICATION

This is a continuation of International Application PCT/JP01/03921, filed May 11, 2001, now abandoned.

TECHNICAL FIELD OF THE INVENTION

This invention relates to information processing in online sales of commodities and so on.

BACKGROUND OF THE INVENTION

Various homepages by shops that sell commodities and so on are opened on the Internet. In such online sales, the payment of the price for the commodities and the like may be carried out by, for example, the bank transfer, postal transfer, cash on delivery, or credit card. Normally, since the communication between the shop server and customer terminal is encrypted by Secure Socket Layer (SSL) and the like in the case of the credit card payment, there must be no case where other people can peep. However, typical customers do not prefer inputting the credit card number for each order of the commodities and the like. On the other hand, if they have to carry out the bank transfer or postal transfer every time, there is a problem where they must spend time and effort and must pay remittance charges. Especially, in the case of C.O.D., the charge for C.O.D. is expensive.

Therefore, a system for exempting from sending the credit card number for each order on the Internet is used. For example, a customer registers the credit card number in a settlement business company in advance by post and the like. When he or she purchases commodities and the like on the homepage of a shop that ties up with the settlement business company, the settlement processing of the order price is carried out by cooperating the shop and the settlement business company and performing customer authentication for the customer by the settlement business company.

SUMMARY OF THE INVENTION

Thus, the cooperation between a server of the settlement business company and a server of the shop is very important.

An object of the invention is to provide a novel information processing for carrying out a processing for changing the state of the order from the customer to the determination of the acceptance of the order in the shop computer.

Another object of the invention is to provide a novel information processing for changing the state of the order from the customer to the determination of the acceptance of the order and carrying out a claim processing of the order price in the shop computer.

A computer system according to a first aspect of the invention comprises: receipt means for registering content information of a customer order into an order storage device, and transmitting at least identification information (for example, control number in an embodiment) of the customer order and shop information (for example, a shop code and/or an address of a shop side computer in an embodiment) to a customer terminal or settlement system, upon receiving an order request from the customer terminal; credit request pre-processing means for reading out the content information of the customer order from the order storage device by using the identification information of the customer order, upon receiving the identification information of the customer order and a session key (for example, an operation key KEY02 in an embodiment) from the settlement system; credit request processing means for transmitting the content information of the customer order that was read out from the order storage device, the session key, and shop authentication information to the settlement server; and credit result processing means for storing information indicating an acceptance of the order for the customer order into the order storage device, upon receiving information indicating the acceptance of the customer order is possible from the settlement system.

By doing so, the computer system of this invention automatically transmit the aforementioned information to the settlement system to carry out a credit request upon receiving a session key representing that the customer authentication and the like was normally completed in the settlement system. Therefore, the labor saving and quick processing are realized in the shop.

The aforementioned credit result processing means may be configured so as to further receive from the settlement system and store into the order storage device, identification information (for example, a receipt number in an embodiment) for the customer order in the settlement system.

The aforementioned credit result processing means may be configured so as to transmit information indicating whether or not the acceptance of the customer order is possible, according to the information received from the settlement system, to the customer terminal. This is to notify the processing result from the shop computer separately from the settlement system.

The aforementioned credit result processing means may be configured so as to store information indicating that the acceptance of the customer order is impossible by using the identification information of the customer order, upon receiving the identification information of the customer order and the information indicating that the acceptance of the customer order is impossible, from the settlement system.

Besides, aforementioned credit result processing means may be configured so as to request a processing for the shipment of a commodity relating to the customer order to a system associated with the shipment of the commodity upon receiving information indicating that the acceptance of the customer order is possible. Besides, the credit result processing means may be configured so as to transmit information indicating that the transmission of data relating to the customer order is allowed, to a system associated with the transmission of the data, upon receiving the information indicating that the acceptance of the customer order is possible. The aforementioned credit result processing means may be configured so as to transmit a pickup request of a commodity relating to the customer order, to a physical distribution system associated with the pickup of the commodity, upon receiving the information indicating that the acceptance of the customer order is possible. Thus, it is possible for the shop side computer according to this invention to cooperate with various systems.

Further, the aforementioned receipt means may be configured so as to carry out a stock confirmation processing of a commodity relating to the customer order. The credit request pre-processing means and the credit request processing means may have the same configuration.

In the first aspect of the invention, the computer system may further comprises: order price claim means for transmitting the identification information of the customer order relating to an order price claim request to the settlement system at an arbitrary timing after the shipment of the commodity relating to the customer order or the provision of the service relating to the customer order, and receiving information indicating whether or not the order price claim processing succeeded, from the settlement system.

Besides, in the first aspect of the invention, the information indicating the acceptance of the customer order is possible is settlement identification information (for example, a receipt number in an embodiment) for the customer order in the settlement system, and the credit result processing means stores the information indicating the acceptance of the customer order is possible and the settlement identification information into the order storage device, and the computer system may further comprise order price claim means for transmitting the identification information of the customer order or the settlement identification information, which relates to an order price claim request, to the settlement system at an arbitrary timing after the shipment of the commodity relating to the customer order or the provision of the service relating to the customer order, and receiving information indicating whether or not the order price claim processing succeeded, from the settlement system.

By doing so, since the price claim processing can also be requested to the settlement system, the labor saving is realized in the shop. Incidentally, information for specifying the order, which is used in the order price claim request, may be identification information of the customer order or settlement identification information.

The aforementioned order price claim means may be configured so as to further transmit authentication information of the shop relating to the order price claim request to the settlement system.

Besides, the aforementioned order price claim means may be configured so as to record claim completion information correspondingly to the customer order into the order storage device, upon receiving the information indicating that the order price claim processing succeeded from the settlement system.

Furthermore, the aforementioned order price claim means may be configured so as to operate in response to receiving a delivery completion notice from a system (for example, a physical distribution system in an embodiment) associated with the delivery of the commodity relating to the customer order. In this invention, not only an instruction by a staff member of the shop, but also the cooperation with the physical distribution system make it possible to carry out the order price claim request.

An order processing method according to a second aspect of the invention comprises the steps of: registering content information of a customer order into an order storage device, and transmitting at least identification information of the customer order and shop information to a customer terminal or settlement system, upon receiving an order request from the customer terminal; reading out the content information of the customer order from the order storage device by using the identification information of the customer order, upon receiving the identification information of the customer order and a session key from the settlement system; transmitting the content information of the customer order that was read out from the order storage device, the session key, and shop authentication information to the settlement server; and storing information indicating an acceptance of the order for the customer order into the order storage device, upon receiving information indicating an acceptance of the customer order is possible from the settlement system.

The modifications relating to the first aspect of the invention may be applied to modifications relating to the second aspect of the invention.

It is also possible to create a program for causing a computer to execute such methods, and the program is stored in a storage medium or a storage device, for example, a floppy disk, a CD-ROM, a magnet-optical disk, a semiconductor memory, or a hard disk. Besides, the program may be distributed via a network. Incidentally, an intermediate processing result is temporarily stored on a memory.

BRIEF DESCRIPTION OF THE DRAWINGS

FIG. 8 is a flowchart of a sales determination processing.

DETAIL DESCRIPTION OF THE PREFERRED EMBODIMENTS

Figure 1:
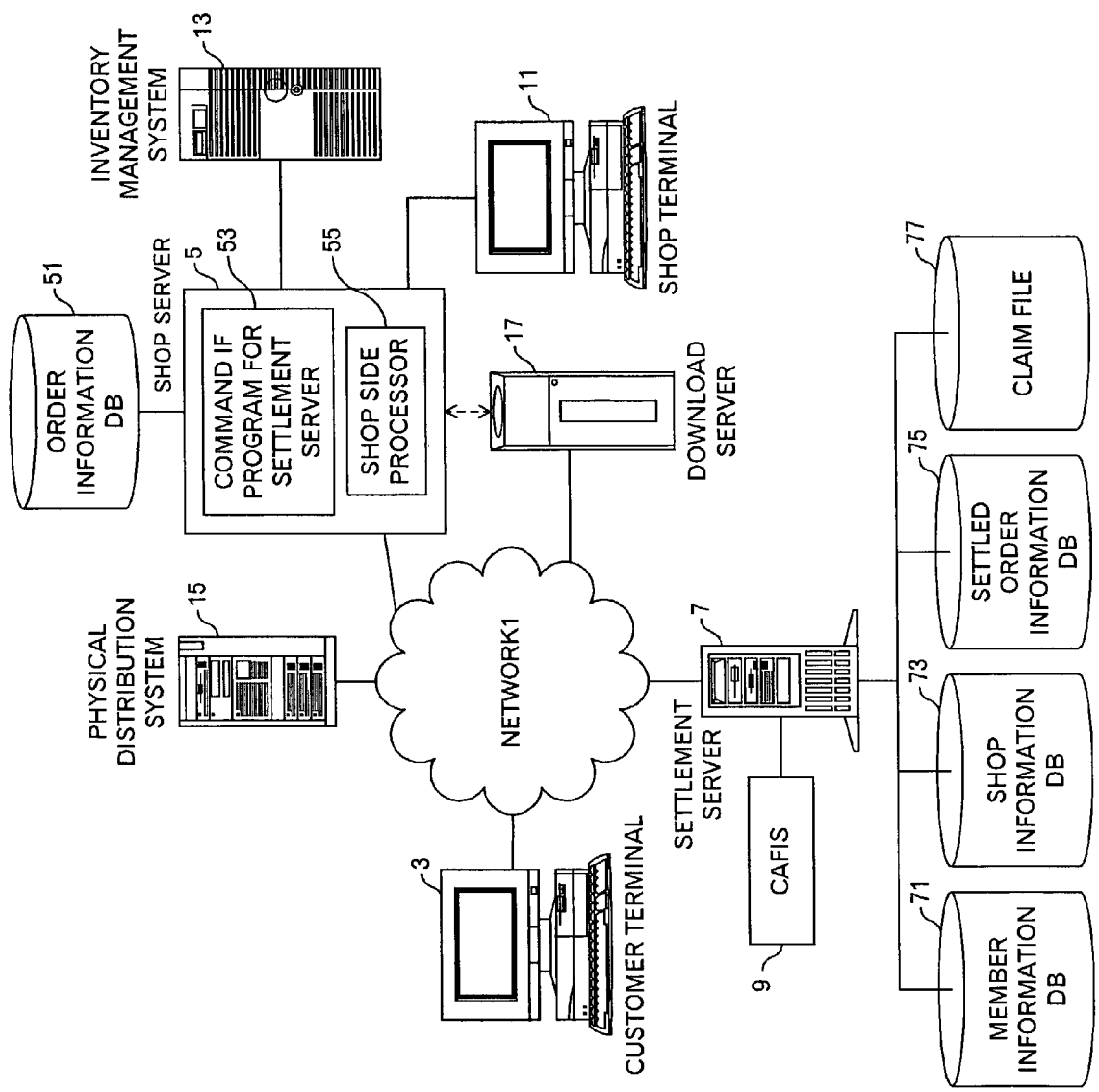
FIG. 1 is a block diagram showing an outline of the whole system in the invention.

FIG. 1 shows a system outline in one embodiment of the invention. For example, one or a plurality of customer terminals 3 including a web browser, a shop server 5 that is a web server performing online sales of commodities and the like, and a settlement server 7 performing a settlement processing of the order price according to one embodiment of the invention are connected to a network 1 such as the Internet.

The shop server 5 includes a command interface (IF) program 53 for the settlement server, which are distributed from, for example, an administrator of the settlement server 7, and a shop side processor 55 for other processings in the shop server 5. Besides, in the shop server 5, a database for commodities and the like being sold, and an order information database (DB) 51 for storing information concerning orders accepted from the customers and so on are provided, and the shop terminal 11 operated by a staff member of the shop is connected to the shop server 5. Further, the shop server 5 may connect to, for example, an inventory management system 13, and/or a server (not shown) for carrying out a processing for shipping commodities and the like. The shop server 5 itself may have functions for the inventory management system 13 and/or a server for carrying out a processing for shipping commodities and the like. Further, in a case where a business to get compensation for having the customer terminal 3 download programs and/or content data via the network 1 is carried out in the shop server 5, a download server 17, which stores, for example, the programs and/or the content data may be connected to the network 1 and it may be configured so as to cooperate with the shop server 5. The shop server 5 may have a function of the download server 17.

A physical distribution system 15 for, for example, a carrier or a shipping section of a company operating the shop server 5 is connected to the network 1. This physical distribution system 15 may be connected to the shop server 5 via other network and/or a private line and son on. A lot of servers and others are connected to the network 1.

The settlement server 7 carries out a settlement processing of the purchased price of commodities purchased by a customer who is a member of a predetermined Internet service provider (ISP) in this embodiment and has registered the credit card information in advance, for the customer. Therefore, the settlement server 7 can refer to a member information database 71 storing information of member IDs and passwords, and information of credit cards. Besides, in this embodiment, a configuration where the usage of the settlement server 7 is permitted to a shop server 5, for which it is judged that it satisfies a predetermined condition, is adopted. Therefore, the settlement server 7 can refer to a shop information database 73 storing shop information including an ID and password for each shop or each shop server 5. In this embodiment, since the settlement by the credit card is performed, the settlement server 7 connects to a credit and finance information switching system (CAFIS) 9 that is a credit online system, and can communicate with computers of the credit card companies. Since a processing for, for example, credit card companies is necessary also in the settlement server 7, it is necessary to receive the order information from the shop server 5 and store the order information. Therefore, the settlement server 7 uses a settled order information database (DB) 75 registering the order information and the like. Furthermore, the settlement server 7 also uses a claim file 77 storing information for charging for the credit card companies.

Processings in the system shown in FIG. 1 will be briefly explained below. The customer operates the customer terminal 3 to access the shop server 5 via the network 1 and searches for a commodity and so on to be purchased. When the commodity that is desired to be purchased is found, the customer transmits an order of the commodity from the customer terminal 3 to the shop server 5. At this time, the customer instructs to use the settlement system according to this embodiment for the settlement. The shop server 5 registers order information received from the customer terminal 3 into the order information DB 51, and transfers the order information in addition to information on the shop server 5 (for example, shop authentication information, shop identification information, address of the shop server 5 or the like), and an address of the customer terminal 3 and the like to the settlement server 7. The settlement server 7 carries out confirmation and/or authentication of the shop by using the information on the shop server 5, and preliminarily registers the order information. If there is no problem in the information on the shop server 5 and the order information, the settlement server 7 generates an operation key KEY1, and transmits screen information prompting to input the customer (member) ID and password, and the operation key KEY01 as a hidden parameter to the customer terminal 3.

The customer terminal 3 displays the screen prompting to input the ID and password for the customer. Then, the customer inputs the customer (member) ID and password, and the customer terminal 3 transmits the ID and password and the operation key KEY01 of the hidden parameter to the settlement server 7. In the settlement server 7, it is checked whether or not a pair of the ID and password is true, whether or not the customer of the received customer ID is a normal member in the ISP, and whether or not the customer is qualified for using the settlement system according to this embodiment. If all of the checks are normally completed, the settlement server 7 generates an operation key KEY02. Then, if all of the checks are normally completed, the settlement sever 7 transmits the operation key KEY2 as a hidden key, the results of the checks, and order identification information in the shop server 5 (hereinafter, called control number. Incidentally, it may be symbols, not only the numerals.), which is included in the order information or was transmitted to the settlement server 7 separately from the order information, to the shop server 5. If any one of the checks has any error, the operation key KEY2 is not generated, and it is notified to the shop server 5 that an error has occurred in any one of the checks. In a case where the pair of the ID and password is not true, it is also notified to the customer terminal 3. For example, it is permitted to retry to input the pair of the ID and password until twice. Up to this stage, the customer authentication processing and the confirmation processing of the system usage qualification are completed.

In a case where the check result indicates the success of the check, the shop server 6 reads out the order information from the order information DB 51 by using the received control number, and outputs the order information, the control number, and the operation key KEY02 to the command interface (command IF) program 53 for the settlement server that is being executed in the shop server 5. The command IF program 53 for the settlement server is a program providing an interface to exchange information between the settlement server 7 and the shop server 5, and it is provided for the shop from an administrator of the settlement server 7, for example. If any error occurred in a check of whether or not the customer of the customer ID is a normal member in the ISP, or whether or not the customer is qualified for using the settlement system according to this embodiment, the shop server 5 notified the customer terminal 3 that the settlement system according to this embodiment cannot be used.

The command IF program 53 for the settlement server that received the order information, the control number, and the operation key KEY02 transmits such information with the shop authentication information to the settlement server 7. The settlement server 7 carries out the authentication processing for the shop, collates the order information received at this time with the preliminarily registered order information, and confirms the legitimacy of the received operation key KEY02. Then, in a case where these processing results are affirmative, the credit processing is performed. The credit processing is a processing for inquiring the credit state for the CAFIS 9 by using the credit card number of the customer, which is registered in advance in the settlement server 7. When information to the effect that it is possible to settle by the credit card of the customer is received from the CAFIS 9, the settlement server 7 registers the order information in the settled order information database (DB) 75 in the settlement server 7, and generates a receipt number (symbols may be used, not numerals.) that is identification information of the order information in the settlement server 7. Then, in a case where the order information was registered in the settled order information DB 75, an order registration notification mail for notifying that the order has been registered is transmitted to the customer.

The settlement server 7 transmits information indicating whether or not the order information was registered, receipt number if registered, and the control number to the command IF program 53 for the settlement server. The command IF program 53 for the settlement server outputs the received information to a processor for carrying out order management in the shop server 5. Then, the shop server 5 transmits screen information for indicating that the order has been accepted by the settlement system to the customer terminal 3. The customer terminal 3 displays a screen indicating the order has been accepted by the settlement system. Besides, the shop server 5 registers information indicating the acceptance of the order into the order information DB 51. On the other hand, if any one of the processing results of the shop authentication processing, the legitimacy confirmation processing of the operation key KEY02, and the credit processing is negative, the shop server 5 transmits screen information for indicating the order has not been accepted by the settlement system to the customer terminal 3. Besides, in a case where any processing result other than the result of the shop authentication processing is negative, information indicating that the order is impossible is registered in the order information DB 51. Then, a notice to the effect that it is impossible to accept the order is transmitted to the customer terminal 3. Up to this stage, the order accepting processing is completed.

A staff member of the shop who operates the shop terminal 11 connected to the shop server 5 refers to an order to which the information indicating the acceptance of the order was registered in the order information DB 51 of the shop server 5, for example, and carries out a work for shipment of the commodity. Incidentally, it is possible to configure the shop server 5 so as to move or copy the order information as accepted order information from the order information DB 51 to accepted order information DB when the order information is registered into the database of the settlement server 7, and then the accepted order information DB may be referred. Besides, it is also possible to configure the shop server 51 so as to automatically output a pickup request to the physical distribution system 15 when the information indicating the acceptance of the order was registered in the order information DB 51. Besides, in a case where programs and/or content data are downloaded, it is possible to configure to output download permission from the shop server 5 to the download server 16 when the information indicating the acceptance of the order was registered into the order information DB 51. Further, it is possible to configure to automatically output a processing request to another system associated with the commodity shipment from the shop server 5 after the information indicating the acceptance of the order was registered into the order information DB 51, if such a system exists. Anyway, a processing for the shipment of the commodity and the like to the customer who performed the order is performed. Incidentally, the completion of the shipment and/or the delivery is also registered into the order information DB 51.

At a stage to charge the order price after the shipment and/or delivery is completed, for example, the staff member of the shop who operates the shop terminal 11 refers to the order information DB 51, and extracts the control number or receipt number of the order that is an object of the order price claim. Incidentally, in a case where the physical distribution system 15 and the shop server 5 cooperate together, the shop server 5 receives a delivery completion notice from the physical distribution system 15. The control number or the receipt number is extracted from this delivery completion notice. Further, in a case where the download server 17 and the shop server 5 cooperate together, the shop server 5 receives a download completion notice from the download server 17. Then, the control number or the receipt number is extracted from this download completion notice. When the control number or the receipt number of the order that is an object of the order price claim is outputted as an order price claim request to the command IF program 53 for the settlement server in the shop server 5, the command IF program 53 for the settlement server transmits the control number or the receipt number with the shop authentication information to the settlement server 7.

The settlement server 7 carries out the authentication processing for the shop by using the shop authentication information. If the result of the authentication processing is affirmative, it registers information indicating sales determination for the order that corresponds to the receipt number or the control number and is registered in the settlement server 7, and carries out an order price claim processing. The order price claim processing is a processing for adding information of the order price claim to information for charging the price to the credit card company of the credit card registered by the customer. This information for charging the price is given to the credit card company, for example, once every month. The credit card company charges each customer the price based on such information. When the order price claim processing is completed, the processing result is transmitted to the command IF program 53 for the settlement server, and the command IF program 53 for the settlement server outputs the processing result to a sales determination processor of the shop server 5. If the result of the order price claim processing is affirmative, the shop server 5 registers the sales determination or claim completion for the order corresponding to the control number or the receipt number in the order information DB 51, for example. On the other hand, if the result of the order price claim processing is negative, since this is a case where the control number or the receipt number is incorrect, and so on, a notice to prompt to confirm that is outputted to the shop terminal 11. By the above-mentioned processing, the settlement is completed.

The details of the system operation in this embodiment will be explained below by using FIGS. 2 to 8.

Figure 2:
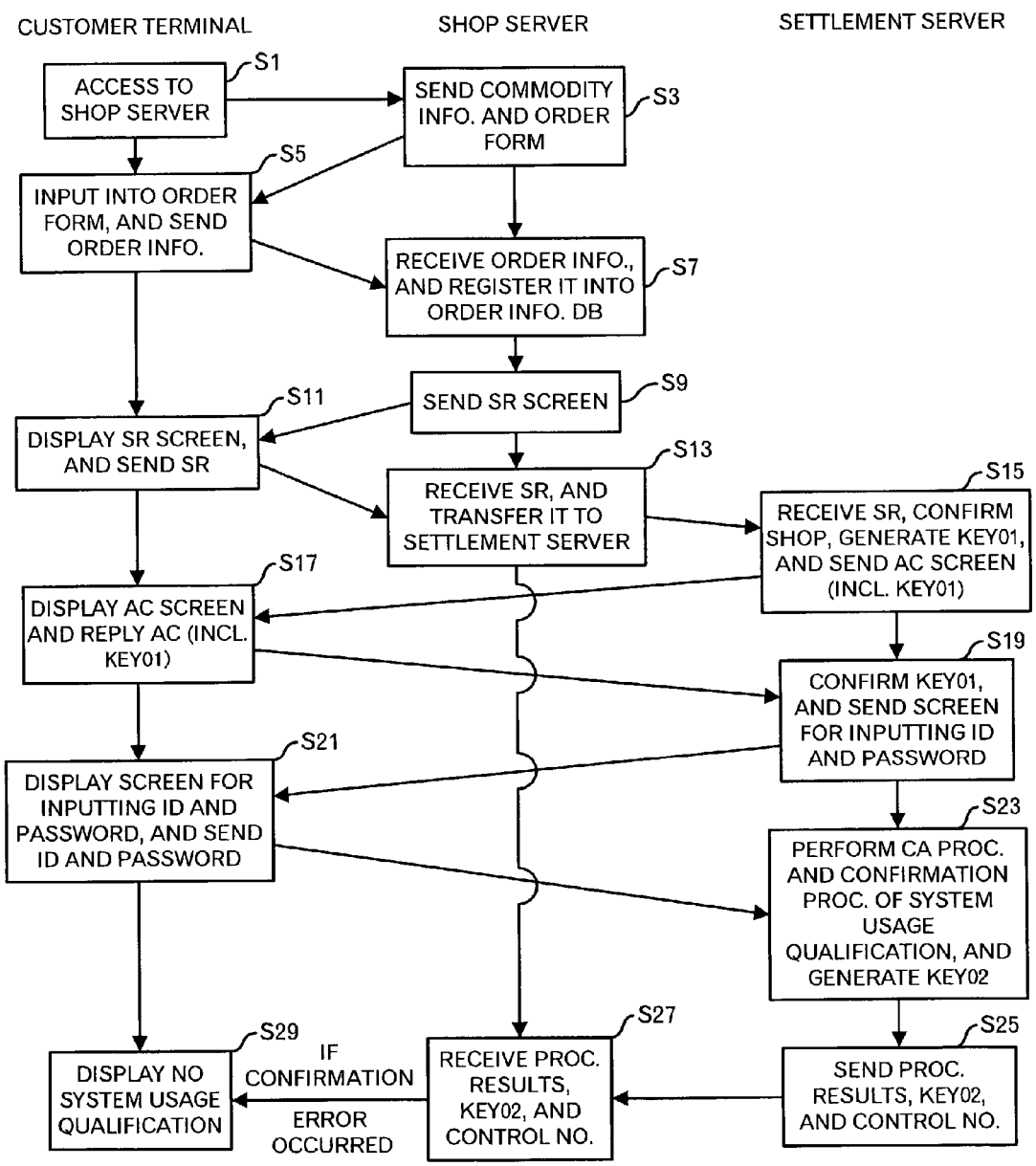
FIG. 2 is a flowchart of a customer authentication processing and system usage qualification confirming processing according to a first embodiment.

1. Customer Authentication Processing and Confirmation Processing for System Usage Qualification First Embodiment FIG. 2 shows a flow of the customer authentication processing and confirmation processing of the system usage qualification according to the first embodiment. For example, a customer operates a customer terminal 3 to access to a shop server 5 (step S1). For example, the shop server 5 transmits commodity information and order form to the customer terminal 3 (step S3). There are various modes for the processing of the steps S1 and S3, and only a simple case is indicated here. The customer terminal 3 displays the commodity information and the order form by a web browser. The customer inputs an order content into the web browser, pushes a send button included in the order form, and sends order information to the shop server 5 (step S5). The order information includes a commodity name, commodity number, volume, price, address, name, telephone number, E-mail address and so on. Besides, it is possible to configure the order information to include information indicating the settlement system according to this embodiment was selected as a settlement method. Further, it may include a customer (member) ID of an ISP associated with the settlement system according to this embodiment. Incidentally, the shop server 5 and the customer terminal 3 mutually recognize their addresses.

When the shop server 5 receives the order information from the customer terminal 3, it registers the order information into an order information DB 51 after it confirms a format of the order information and the like (step S7). Incidentally, before the registration, it is possible to inquire the stock to the inventory management system 13. Then, the shop server 5 transmits screen information of a settlement request that includes the received order information, address information (for example, a uniform resource locator (URL)) of a processor (for example, a common gateway interface (CGI)), which receives the result of customer authentication and the like, shop identification (for example, shop code), and identification information (control number) of the order of the customer, and requests to do an authentication procedure and the like for the settlement as to the order information, to the customer terminal 3 (step S9). It is possible to inquire whether or not the settlement system according to this embodiment is selected as a settlement means, in the screen information to be sent here. The customer terminal 3 displays the received screen information in the web browser, and the customer pushes an "OK" button if he or she approves to do the authentication procedure and the like for the settlement by using the settlement system according to this embodiment. Then, a settlement request is transmitted from the customer terminal 3 to the shop server 5 (step S11).

When the shop server 5 receives the settlement request, it transfers the settlement request to the settlement server 7 (step S13). Besides, when transferring, address information of the customer terminal 3 is transferred to the settlement server 7 with the settlement request. Incidentally, there is a case where the shop authentication information (for example, shop ID and password) is transferred separately from the shop identification information or instead of the shop identification information. The settlement server 7 that received the settlement request confirms at least the shop, such as whether the shop identification information is an actually existing code. If the shop authentication information is received, it checks whether or not a pair of the shop ID and password is true. When the shop is confirmed on these points, the order information, address information of the shop server 5, the shop identification information and the control information and the like that are included in the received settlement request are temporarily registered into an order preliminarily-accepted file or the like. Then, the settlement server 7 generates an operation key KEY1, and transmits the operation key KEY01 as a hidden parameter, and screen information for authentication confirmation for having the customer confirm that the customer authentication is performed in the communication with the settlement server 7 from now (step S15). Using the operation key KEY01 is to make it possible to confirm that this processing step has been surely passed through, later.

The customer terminal 3 displays the screen for the authentication confirmation in the web browser, and the customer pushes an "OK" button included in the screen for the authentication confirmation. Then, the authentication confirmation with the operation key KEY01 as the hidden parameter is transmitted from the customer terminal 3 (step S17). The settlement server 7 confirms the legitimacy of the received operation key KEY01. When the legitimacy was confirmed, the settlement server 7 transmits screen information prompting to input the customer ID and password, to the customer terminal 3 (step S19). Incidentally, when the legitimacy of the operation key KEY01 is not confirmed, since any problem may occur if the processing proceeds, for example, an occurrence of the error is notified to the shop server 5 and the customer terminal 3.

The customer terminal 3 displays a screen prompting to input the customer ID and password in the web browser. It is necessary to secure the secrecy of the communication in at least subsequent communication by using the secure socket layer (SSL) technology, for example. SSL may be used before this step. In response to this request, the customer inputs the customer ID and password into the web browser, and pushes a send button provided on the screen in the web browser. Then, the customer terminal 3 transmits the inputted customer ID and password to the settlement server 7 (step S21). Incidentally, here, the customer ID and password are used for the authentication processing for the customer, but if the authentication processing is performed by another method, information necessary for that method is transmitted from the customer terminal 3 to the settlement server 7. Since the customer ID and password are outputted to the settlement server 7 in such a form, the pair of the customer ID and password is not transmitted to the shop server 5, and it is possible to prevent a shop which has ill will or are going to bear ill will from abusing the customer ID and password.

When the settlement server 7 receives the customer ID and password, first it judges whether or not the pair of the customer ID and password is the same as customer information that is registered in the member information DB 71 in advance. If it is not the same, the processing returns to step S21 to input them again. For example, in a case where it cannot judge that it is the same even if the customer ID and password were confirmed three times, the settlement server 7 transmits authentication error screen information to the customer terminal 3. Besides, the settlement sever 7 may notify the shop server 5 of the authentication error.

If the pair of the received customer ID and password is the same as the customer information that is registered in advance, the authentication of the customer is completed. However, in this embodiment, the authentication of the customer does not entirely make it possible to settle by the settlement system according to this embodiment. Next, the settlement server 7 confirms the system usage qualification. In this embodiment, the confirmation of the system usage qualification is carried out at two stages. First, it is confirmed whether he or she is a normal member in a predetermined ISP. That is, even if he or she is a member of the ISP, it is impossible to say that he or she is a normal member in a case where a usage charge of the ISP is overdue. Next, a point of whether or not it is registered that he or she can use the settlement system according to this embodiment is confirmed. Since it is assumed that the settlement is performed by using the credit card in this embodiment, the credit card number must be registered in advance. Besides, it is also possible to provide a reference separately and to make a setting so that only a person who satisfies the reference can use the settlement system according to this embodiment. If the results of such customer authentication processing and confirmation processing of the system usage qualification are affirmative, the settlement server 7 generates an operation key KEY02 (may be called a session key) (step S23). Besides, it is possible that the operation key KEY02, the order information, the control number and the like are stored as a session file and it is used in later processing.

Then, the settlement server 7 transmits the processing results of the customer authentication processing and confirmation processing of the system usage qualification, the operation key KEY2 if the processing results are affirmative, and the control number to the shop server 5 (step S25). The shop server 5 receives such information from the settlement server 7 (step S27). Then, if there is an error in the confirmation processing of the system usage qualification, the shop server 5 notifies the customer terminal 3 that there is no system usage qualification, and the customer terminal 3 performs a display to the effect that there is no system usage qualification (step S29). Besides, the shop server 5 registers that the settlement is impossible, for the order of that control number in the order information DB 51.

Up to this step, the customer authentication processing and confirmation processing of the system usage qualification that are pre-stages of the credit processing are completed. Incidentally, it is possible to variously modify the processing flow shown in FIG. 2. For example, not only a configuration that the shop server 5 transfers the settlement request at the step S13, but also a configuration that the customer terminal 3 directly transmits the settlement server 7 the settlement request are possible. In this case, it is unnecessary that the shop server 5 adds the address information of the customer terminal 3 to the settlement request. Besides, the address of the settlement server 7 is embedded into a screen of the settlement request transmitted to the customer terminal 3.

Besides, in the above explanation, a processing flow in which the system usage qualification is confirmed is adopted, but there is a case where the system usage qualification is not additionally defined. In such a case, this processing flow becomes a processing flow of the customer authentication. In a case of the simple customer authentication, it is possible to configure so as not to transmit the order information and/or the control number that is identification information of the order information to the settlement server 7.

Incidentally, the term of validity may be defined for the operation keys KEY01 and KEY02, and if they do not return within the term of validity, it may be assumed that an error occurs in the confirmation processing of the operation keys.

Second Embodiment

Figure 3:
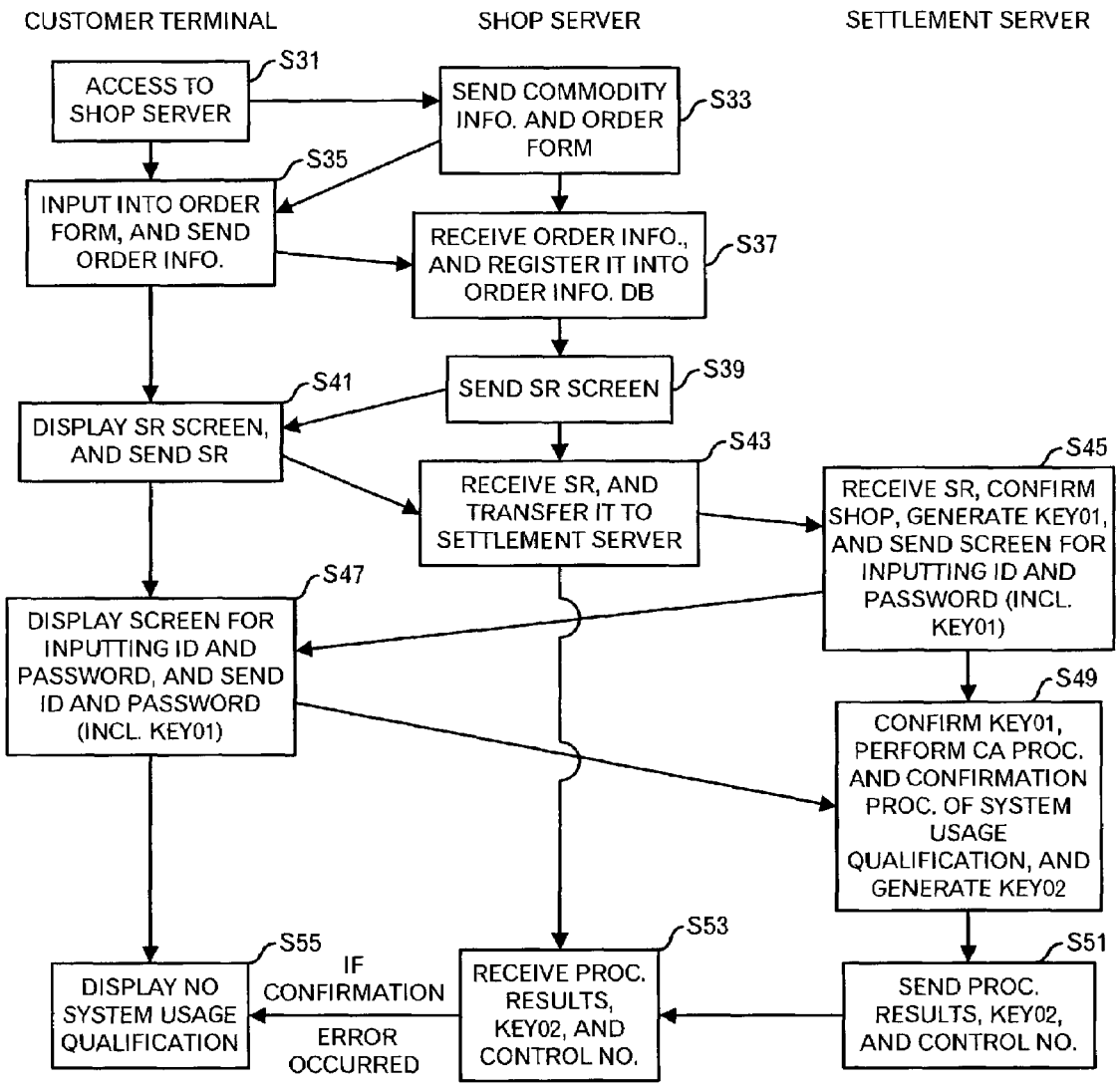
FIG. 3 is a flowchart of a customer authentication processing and confirmation processing of the system usage qualification according to a second embodiment.

Next, the second embodiment of the customer authentication processing and confirmation processing of the system usage qualification is explained by using FIG. 3. For example, a customer operates a customer terminal 3 to access a shop server 5 (step S31). For example, the shop server 5 transmits commodity information and an order form to the customer terminal 3 (step S33). There are various modes for the processing of the steps S1 and S3, and only a simple case is indicated here. The customer terminal 3 displays the commodity information and the order form by a web browser. The customer inputs an order content into the web browser, pushes a send button included in the order form, and sends order information to the shop server 5 (step S35). The order information includes a commodity name, commodity number, volume, price, address, name, telephone number, E-mail address and so on. Besides, it is possible to configure the order information to include information indicating the settlement system according to this embodiment was selected as a settlement method. Further, it may include a customer (member) ID of an ISP associated with the settlement system according to this embodiment. When the shop server 5 receives the order information from the customer terminal 3, it registers the order information into an order information DB 51 after it confirms a format of the order information and the like (step S37). Incidentally, before the registration, it is possible to inquire the stock to the inventory management system 13. Then, the shop server 5 transmits screen information of a settlement request that includes the received order information, address information (for example, a URL) of a processor (for example, a CGI), which receives the result of customer authentication and the like, shop identification (for example, shop code), and a control number of the order, and requests to do an authentication procedure and the like for the settlement as to the order information, to the customer terminal 3 (step S39). It is possible to inquire whether or not the settlement system according to this embodiment is selected as a settlement means, in the screen information to be sent here. The customer terminal 3 displays the received screen information in the web browser, and the customer pushes an "OK" button if he or she approves to do the authentication procedure and the like for the settlement by using the settlement system according to this embodiment. Then, a settlement request is transmitted from the customer terminal 3 to the shop server 5 (step S41).

When the shop server 5 receives the settlement request, it transfers the settlement request to the settlement server 7 (step S43). Besides, when transferring, address information of the customer terminal 3 is transferred to the settlement server 7 with the settlement request. Incidentally, there is a case where the shop authentication information (for example, shop ID and password) is transferred separately from the shop identification information or instead of the shop identification information. The settlement server 7 that received the settlement request confirms at least the shop, such as whether the shop identification information is an actually existing code. If the shop authentication information is received, it checks whether or not a pair of the shop ID and password is true. When the shop is confirmed on these points, the order information, address information of the shop server 5, the shop identification information and the control information and the like that are included in the received settlement request are temporarily registered into an order preliminarily-accepted file or the like. Then, the settlement server 7 generates an operation key KEY1, and transmits the operation key KEY01 as a hidden parameter, and screen information that prompts to input the customer ID and password (step S15). Using the operation key KEY01 is to make it possible to confirm that this processing step has been surely passed through, later.

The customer terminal 3 displays the screen that prompts to input the customer ID and password in the web browser. It is necessary to secure the secrecy of the communication in at least subsequent communication by using the secure socket layer (SSL) technology, for example. SSL may be used before this step. In response to this request, the customer inputs the customer ID and password into the web browser, and pushes a send button provided on the screen in the web browser. Then, the customer terminal 3 transmits the inputted customer ID and password to the settlement server 7 (step S47). Since the customer ID and password are outputted to the settlement server 7 in such a form, the pair of the customer ID and password is not transmitted to the shop server 5, and it is possible to prevent a shop which has ill will or are going to bear ill will from abusing the customer ID and password. Besides, the customer terminal 3 transmits the operation key KEY01 to the settlement server 7.

The settlement server 7 confirms the legitimacy of the received operation key KEY01. If the legitimacy was not confirmed, since any problem may occur if the processing proceeds, for example, an occurrence of the error is notified to the shop server 5 and the customer terminal 3. Furthermore, the settlement server 7 judges whether or not the received pair of the customer ID and password is the same as the customer information registered in advance. If it is not the same, the processing returns to the step S47 to prompt to input again. For example, in a case where it cannot judge that it is the same even if the customer ID and password were confirmed three times, the settlement server 7 transmits authentication error screen information to the customer terminal 3. Besides, the settlement sever 7 may notify the shop server 5 of the authentication error.

If the pair of the received customer ID and password is the same as the customer information that is registered in advance, the authentication of the customer is completed. However, in this embodiment, the authentication of the customer does not entirely make it possible to settle by the settlement system according to this embodiment. Next, the settlement server 7 confirms the system usage qualification. In this embodiment, the confirmation of the system usage qualification is also carried out at two stages. First, it is confirmed whether he or she is a normal member in a predetermined ISP. That is, even if he or she is a member of the ISP, it is impossible to say that he or she is a normal member in a case where a usage charge of the ISP is overdue. Next, a point of whether or not it is registered that he or she can use the settlement system according to this embodiment is confirmed. Since it is also assumed that the settlement is performed by using the credit card in this embodiment, the credit card number must be registered in advance. Besides, it is also possible to provide a reference separately and to make a setting so that only a person who satisfies the reference can use the settlement system according to this embodiment. If the results of such customer authentication processing and confirmation processing of the system usage qualification are affirmative, the settlement server 7 generates an operation key KEY02 (may be called a session key) (step S49). Besides, it is possible that the operation key KEY02, the order information, the control number and the like are stored as a session file and it is used in later processing.

Then, the settlement server 7 transmits the processing results of the customer authentication processing and confirmation processing of the system usage qualification, the operation key KEY2 if the processing results are affirmative, and the control number to the shop server 5 (step S51). The shop server 5 receives such information from the settlement server 7 (step S53). Then, if there is an error in the confirmation processing of the system usage qualification, the shop server 5 notifies the customer terminal 3 that there is no system usage qualification, and the customer terminal 3 performs a display to the effect that there is no system usage qualification (step S55). Besides, the shop server 5 registers that the settlement is impossible, for the order of that control number in the order information DB 51.

Up to this step, the customer authentication processing and confirmation processing of the system usage qualification that are pre-stages of the credit processing are completed. Incidentally, it is possible to variously modify the processing flow shown in FIG. 3. For example, not only a configuration that the shop server 5 transfers the settlement request at the step S43, but also a configuration that the customer terminal 3 directly transmits the settlement server 7 the settlement request are possible. In this case, it is unnecessary that the shop server 5 adds the address information of the customer terminal 3 to the settlement request. Besides, the address of the settlement server 7 is embedded into a screen of the settlement request transmitted to the customer terminal 3.

Besides, as described in the first embodiment, a processing flow in which the system usage qualification is confirmed is adopted, but there is a case where the system usage qualification is not additionally defined. In such a case, this processing flow becomes a processing flow of the customer authentication. In a case of the simple customer authentication, it is possible to configure so as not to transmit the order information and/or the control number that is identification information of the order information to the settlement server 7.

Incidentally, the term of validity may be defined for the operation keys KEY01 and KEY02, and if they do not return within the term of validity, it may be assumed that an error occurs in the confirmation processing of the operation keys.

2. Credit Processing

Figure 4:
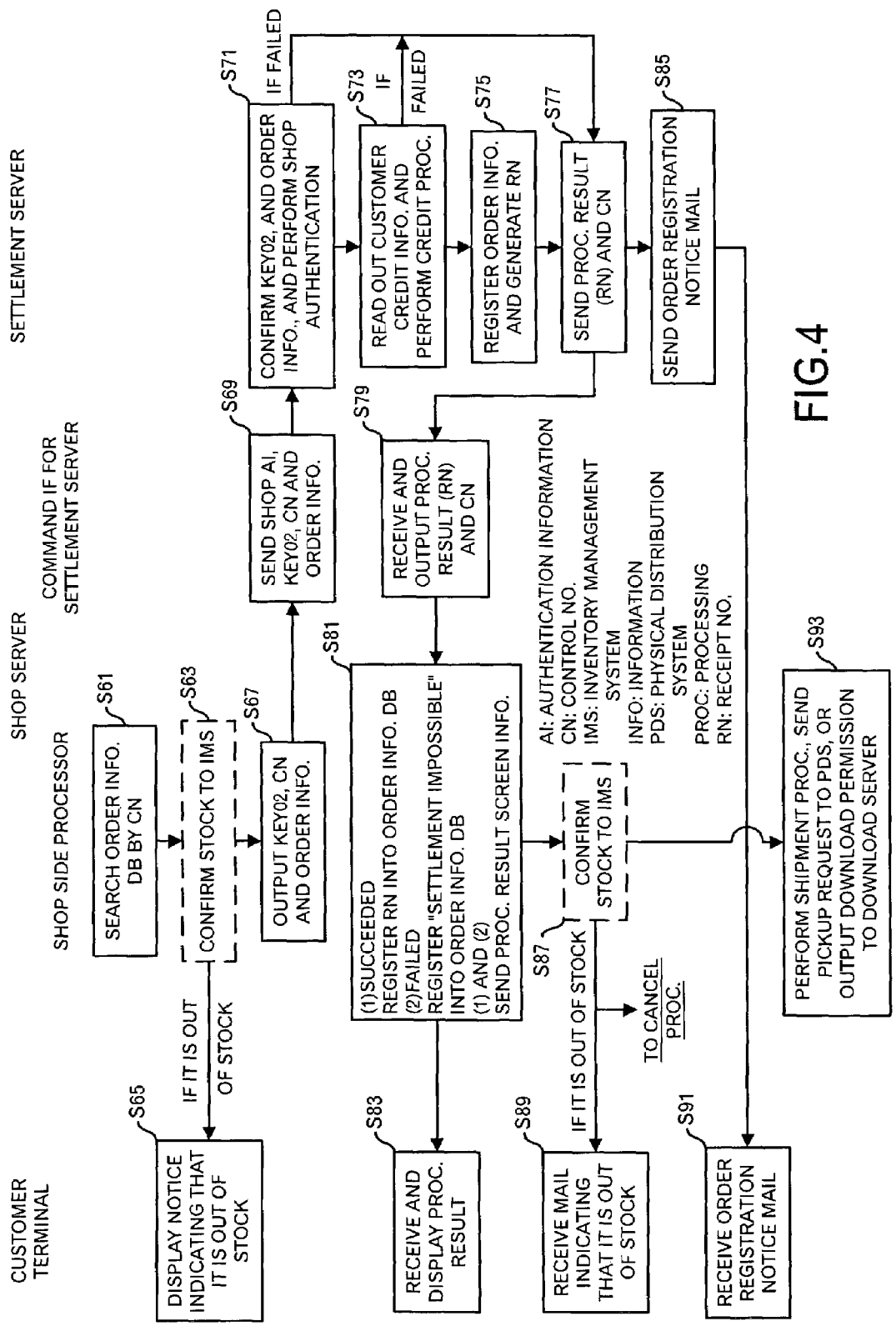
FIG. 4 is a flowchart of a credit processing.

FIG. 4 shows a flow of the credit processing for the customer to whom no error occurred in the customer authentication processing and the confirmation processing of the system usage qualification. Although it is already explained in association with FIG. 1, a functional portion of the shop server 5 (hereinafter, called shop side processor 55 (for example, CGI)) prepared by the shop side and the command interface (IF) program 53 for the settlement server, which carries out a processing for the settlement server 7, are provided in the shop server 5. In this embodiment, these are separately explained.

First, the shop side processor 55 of the shop server 5 searches the order information DB 51 by using the control key that was received at the step S27 or S53, and extracts the order information relating to the control number (step S61). For example, it is possible that the shop side processor 55 confirms the stock of the commodity relating to the order for the inventory management system 13 at this time (step S63). Since this step can be carried out in a case where it is possible to cooperate with the inventory management system 13, this step S63 is surrounded by a dotted line in FIG. 4. If it is judged that it is out of stock at this time, the shop side processor 55 notifies the customer terminal 3 that it is out of stock, and the customer terminal 3 displays a notice to the effect that it is out of stock (step S65).

In a case where it does not cooperate with the inventory management system 13 or the stock was confirmed, the shop side processor 55 outputs the operation key KEY02, the control number, and the order information to the command IF program 53 for the settlement serer (step S67). Incidentally, it is possible to configure so as to additionally output information on the term of validity of the credit card, which is separately obtained from the customer. The command IF program 53 for the settlement server transmits shop authentication information in addition to the information received from the shop side processor 55 to the settlement server 7 (step S69).

The settlement server 7 confirms the legitimacy of the received operation key KEY02 by using the session file that stores the transmitted operation key KEY2, for example. In a case where the term of validity is defined for the operation key, it is checked that it was received within the term of validity. Besides, by comparing the order information and the control number that are received at this time with the order information and the control number that are stored in the session file, the consecutiveness of the processing and the legitimacy of such information are confirmed. If an error is detected in such confirmations, no subsequent processing is carried out and the processing shifts to the processing at step S77. Beside, the settlement server 7 carries out the shop authentication processing by using the shop authentication information, that is, a pair of shop ID and password (step S71). If the shop authentication is failed, the processing also shifts to the step S77. If the shop authentication succeeds, it reads out the credit card number of the customer who is judged as the proper customer in the customer authentication processing and the confirmation processing for the system usage qualification from the database that stores the customer information, and carries out the credit processing by using the CAFIS 9 to confirm whether or not the credit card is proper (step S73). For example, if it is confirmed that it is a proper credit card, an approval number is obtained from the CAFIS 9. In a case where the credit processing is failed, that is, there is a problem in the credit limit or the term of validity of the credit card, the processing shifts to the step S77.

If the credit processing at the step S73 succeeds, the received order information is registered into the settled order information DB 75. Then, a receipt number (there is a case where symbols are used, not numerals.) that is identification information of the order information in the settlement server 7 is generated (step S75). Thus, the order is determined as an accepted order in the settlement server 7. In the settlement server 7, the receipt number, control number and order information are correspondingly stored into the settled order information DB 75.

Then, the settlement server 7 transmits the processing results up to the step S71 and S73, the receipt number when the order information could be registered, and the control number to the command IF program 53 for the settlement server in the shop server 5 (step S77). The command IF program 53 for the settlement server outputs the received information to the shop side processor 55 (step S79). In a case where the received processing results indicate that processings up to the step S71 and S73 succeed, the received receipt number and the control number and the corresponding order information are registered in the order information DB 51, correspondingly. If the receipt number is registered, the acceptance of the order is determined. Incidentally, the determination of the accepted order may be registered in another way. Besides, it is also possible that information concerning the order for which acceptance is determined (order information, receipt number, and control number) is moved or copied to another accepted order information database (DB), and it is used for later processings. If either of the received processing results indicates it is failed, information indicating the settlement is impossible is registered as to the order of the received control number in the order information DB 51. In any case of success and failure, the shop side processor 55 transmits a portion of the received processing results, which can be disclosed to the customer, to the customer terminal 3 (step S81). For example, information such as "The settlement registration is completed. A completion notice of the order registration will be separately transmitted from the settlement server by E-mail." or "The settlement registration was impossible since the credit card was not within the term of validity." is transmitted. The customer terminal 3 displays the received processing results in the web browser (step S83). Incidentally, in a case where an error occurred in the shop authentication processing, the shop server 5 may request the credit processing for the settlement server 7 again.

Besides, the settlement server 7 transmits an order registration notice mail for notifying that the order information was registered into the settlement server 7, to the customer (step S85). In response to this, the customer terminal 3 receives the order registration notice mail (step S91). The order registration notice mail is transmitted for the confirmation by the customer. Incidentally, the mail may not be received by the customer terminal 3 immediately after the transmission.

Besides, the shop side processor 55 of the shop server 5 may carry out stock confirmation of the ordered commodity to the inventory management system 13 for the shipment of the commodity and so on to be carried out next (step S87). It is arbitrary whether or not to carry out the stock confirmation. If it is detected that it is out of stock by carrying out the stock confirmation at this time, the shop side processor 55 of the shop server 5 transmits a mail indicating that it is out of stock to the customer, for example, and carries out a processing for canceling the accepted order that will be explained later. The customer terminal 3 receives the mail indicating that it is out of stock (step S89). Besides, the shop side processor 55 registers the cancellation of the accepted order in the order information DB 51.

In a case where the stock was confirmed by the stock confirmation processing for the inventory management system 13 or the stock confirmation processing is not carried out, a predetermined processing for shipment is requested to another system or carried out, a picking request is transmitted to the physical distribution system 15, or a permission for the customer terminal 3 to download programs or content data is outputted to the download server 17 (step S93). Incidentally, whether or not the step S93 is also carried out depends on the configuration of the shop system including the shop server 5. Therefore, the step S93 may not be carried out at all.

By doing such processings, the credit processing and accepted order determination processing are performed.

3. Accepted Order Cancellation and Commodity-Returning Processing

Figure 5:
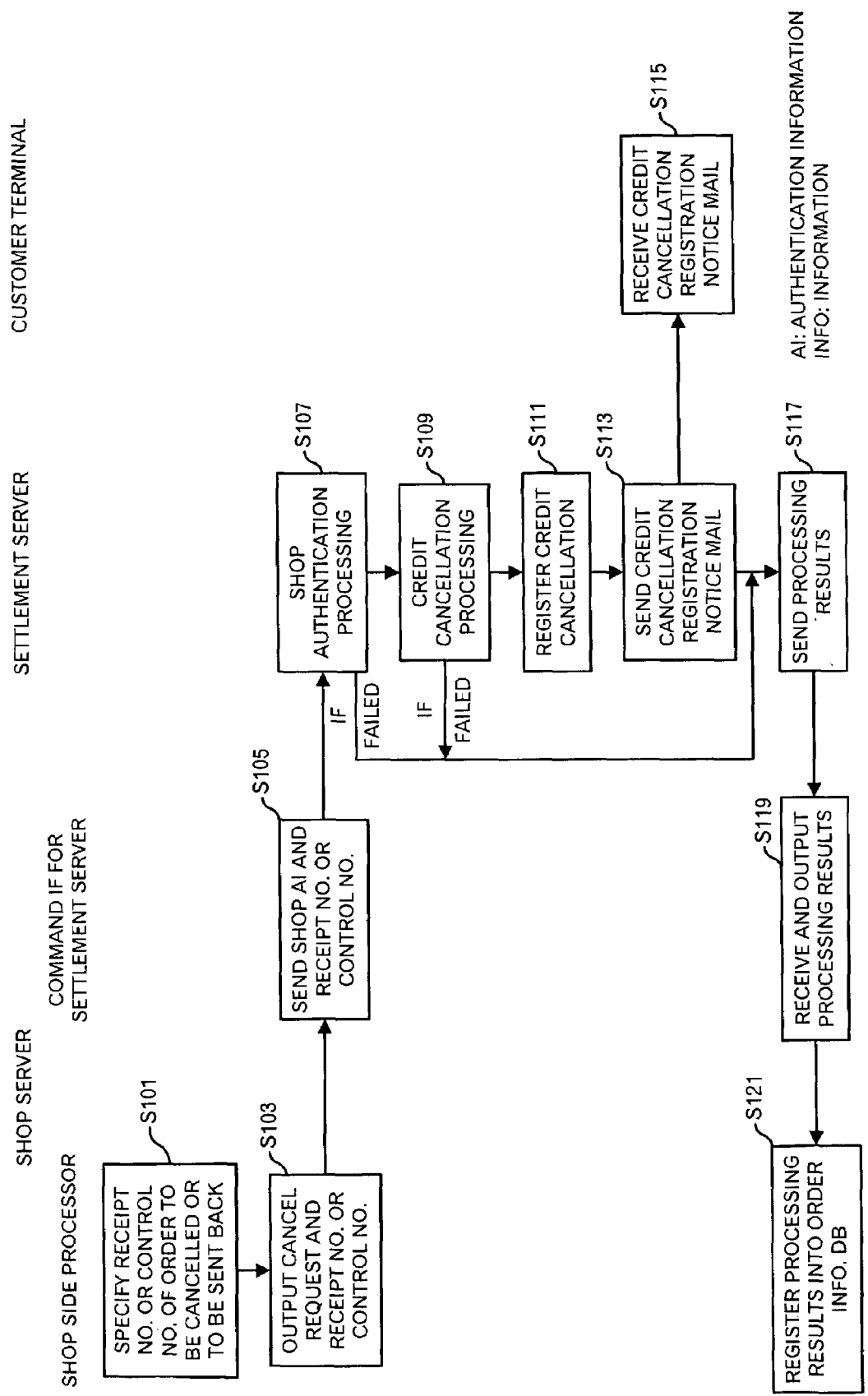
FIG. 5 is a flowchart of an order-cancel and commodity-returning processing.
Figure 6:
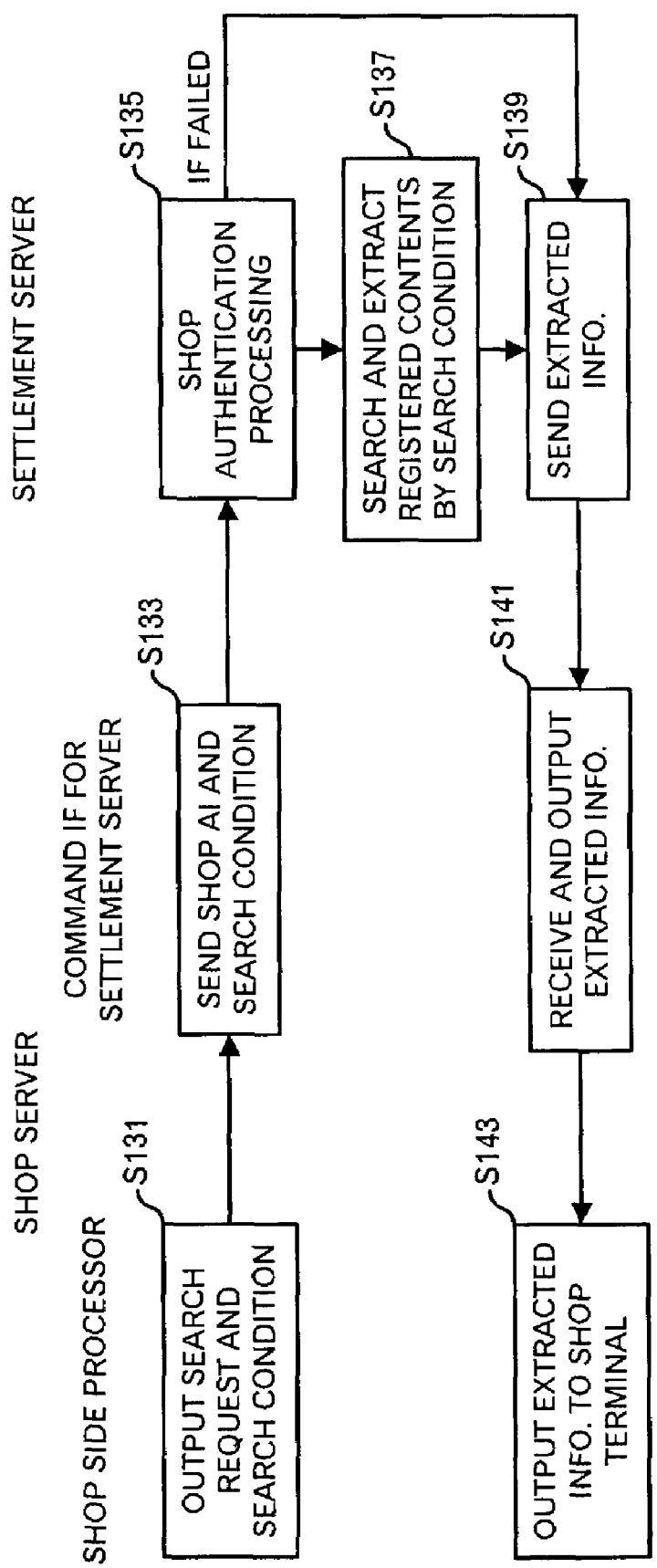
FIG. 6 is a flowchart of a search processing.

In FIG. 5, a processing in a case where the accepted order is canceled since it is out of stock, as described above, the commodity is sent back from the customer, or the customer cancels the order after the order registration notice mail was received and so on will be explained.

The shop side processor 55 of the shop server 5 first specifies the receipt number or control number of the order that is an object of the cancellation of the accepted order or the return of the commodity (step S101). This is carried out by a staff member operating the shop terminal 11 and searching the order information DB 51, for example. For example, if the shop staff member instructs the shop terminal 11 to carry out a cancellation processing by using the specified receipt number or control number, the shop side processor 55 that received the instruction from the shop terminal 11 outputs a cancellation request, and the receipt number or control number to the command IF program 53 for the settlement server (step S103). Incidentally, it is possible to additionally send the reason of the cancellation.

The command IF program 53 for the settlement server transmits the shop authentication information, and the receipt number or control number to a processor that performs the cancellation of the accepted order in the settlement server 7 (step S105). It is also possible to additionally send the reason of the cancellation. The settlement server 7 carries out the authentication processing for the shop by using the received shop authentication information (step S107). If an error occurs in the authentication processing, the processing shifts to the step S117. If the shop authentication succeeds, next, a credit cancellation processing is carried out (step S109). In a case where the approval number was obtained from the CAFIS 9, for example, the credit cancellation processing is to carry out a cancellation processing for the approval number to the CAFIS 9, for example. There is a case where the credit cancellation processing is failed because of any reason. In this case, the processing shifts to the step S117.

In a case where the credit cancellation processing succeeded, the credit cancellation is registered for the order information corresponding to the control number or receipt number, that is registered in the settled order information DB 75 of the settlement server 7 (step S111). Thus, it becomes possible not to carry out a claim processing for the order that is cancelled. Then, a credit cancellation registration notice mail for notifying the registration of the credit cancellation is transmitted to the customer who carried out the order that was canceled (step S113). The customer receives the credit cancellation registration notice mail by the customer terminal 3 (step S115). Thus, the customer can also confirm that the order was officially cancelled in the settlement server 7.

After that, the settlement server 7 transmits the processing result to the command IF program 53 for the settlement server of the shop server 5 (step S117). The command IF program 53 for the settlement server receives the processing result, and outputs it to the shop side processor 55 (step S119). The shop side processor 55 registers the processing result into the order information DB 51, for example (step S121). Besides, it is possible to notify the processing result to the shop terminal 11. Incidentally, if the credit cancellation is failed, the credit cancellation processing must be carried out until the cancellation is completed.

4. Search Processing

There is a case where a search of the order information is requested from the shop server 5 to the settlement server 7 in order to collate the order information stored in the order information DB 51 of the shop server 5 with the order information stored in the settled order information DB 75 of the settlement server 5 and so on. The search processing is explained using FIG. 6. The search processing includes a processing for referring to a list of the accepted order status and a processing for referring to the details of the accepted order status. In the processing for referring to a list of the accepted order status, by specifying search conditions, such as the receipt number, control number, processing state, customer ID, and the term, an output, which, for example, lists the matched order information, can be obtained. On the other hand, in the processing for referring to the details of the accepted order status, when the receipt number or control number is inputted as a search condition, the details of the corresponding order information can be obtained.

For example, when a staff member of the shop who operates the shop terminal 11 determines the search condition, input it, and instructs the search execution to the shop terminal 11, the shop terminal 11 transmits a search command including the search condition to the shop server 5. The shop side processor 55 of shop server 5 that received the search command outputs a search request and the inputted search condition to the command IF program 53 for the settlement server (step S131). The command IF program 53 for the settlement server transmits the shop authentication information and received search condition to a processor for performing the search processing in the settlement server 7 (step S133). The settlement server 7 carries out the shop authentication processing by using the received shop authentication information (step S135). If an error occurred in the authentication processing, the processing shifts to the step S139. When the shop is authenticated in the authentication processing, the settlement server 7 searches the order information registered in the settled order information DB 75 of the settlement server 7 by the received search condition. Then, it extracts order information matched with the search condition (step S137).

The settlement server 7 transmits the extracted order information to the command IF program 53 for the settlement server in the shop server 5 (step S139). Incidentally, in a case where the shop authentication was failed, information to the effect that the authentication was failed is transmitted instead of the extracted information. The command IF program 53 for the settlement server receives the extracted order information and the like, and outputs it to the shop side processor 55 (step S141). The shop side processor 55 outputs the received order information and the like to the shop terminal 11 (step S143). The shop terminal 11 displays the received order information and the like for the shop staff member.

Thus, by not only the order information DB 51 of the shop server 5, but also the order information registered in the settled order information DB 75 of the settlement server 7, the order information, the processing status and so on can be confirmed.

5. Customer Confirmation Processing

Separately from the customer authentication processing and the confirmation processing of the system usage qualification, it is convenient that only the system usage qualification of the settlement system according to this embodiment, or only the membership of the ISP can be confirmed before the order is accepted, for example, and/or the customer can be easily confirmed in a case where a special service and the like are provided for only a person who has the system usage qualification of the settlement system according to this embodiment and so on.

Figure 7:
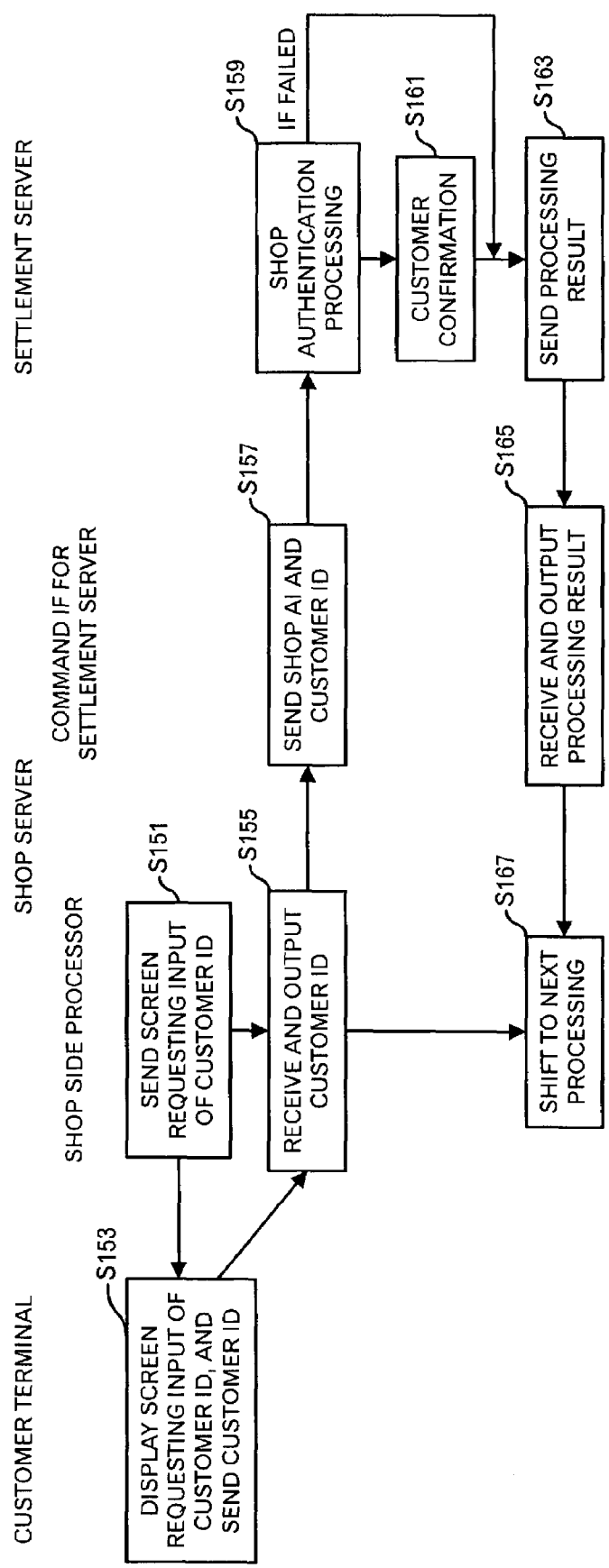
FIG. 7 is a flowchart of a customer confirmation processing.

FIG. 7 shows a processing flow for the customer confirmation.

First, the shop side processor 55 of the shop server 5 outputs screen information prompting to input a customer ID to a customer terminal 3 after any processing (stop S151). The customer terminal 3 displays the received screen information within the web browser, and in response to the input request of the customer ID, the customer inputs the customer ID, and pushes a "send" button within the web browser. Then, the customer terminal 3 transmits the customer ID to the shop server 5 (step S153).

When the shop side processor 55 of the shop server 5 receives the customer ID from the customer terminal 3, it outputs the customer ID to the command IF program 53 for the settlement server (step S155). The command IF program for the settlement server transmits the shop authentication information and the received customer ID to a customer confirmation processor of the settlement server 7 (step S157). The settlement server 7 carries out the shop authentication processing by using the received shop authentication information. If the shop authentication is failed, the processing shifts to step S163. If the shop authentication succeeded, the settlement server 7 carries out the customer confirmation processing by using the customer ID (step S161). Here, in the customer confirmation processing, as described above, it is confirmed whether or not he or she is a normal member of a predetermined ISP, and whether or not he or she can use the settlement system according to this embodiment. Incidentally, it is possible to configure so as to confirm only whether or not he or she is a normal member of a predetermined ISP.

Anyway, the settlement server 7 transmits the processing result of the customer confirmation processing to the command IF program 53 for the settlement server (step S163). If an error occurred in the shop authentication processing, it transmits the result that indicates an error occurred in the shop authentication processing to the command IF program 53 for the settlement server. The command IF program 53 for the settlement server receives the processing result, and outputs it to the shop side processor 55 (step S165). The shop side processor 55 refers to the received processing result, and carries out the next predetermined processing. For example, in a case where the customer is confirmed, the customer terminal 3 is prompted to input the order information, and/or screen information for showing special commodities is outputted to the customer terminal 3 (step S167). Besides, in a case where the customer could not be confirmed, the input of the customer ID is prompted again, and/or screen information including a display to the effect that the order cannot be accepted is transmitted to the customer terminal 3. Besides, in a case where the shop authentication was failed, the command IF program 53 for the settlement server may be instructed to carry out the customer confirmation processing again.

As described above, it is possible to cause the settlement server 7 to carry out the customer confirmation separately from the customer authentication processing and confirmation processing of the system usage qualification.

6. Sales Determination Processing

After the delivery of the commodity or the provision of the service is carried out, for example, in response to the customer order, or programs and/or content data is caused to download, a processing for determining the sales must be performed. FIG. 8 shows a flow of a sales determination processing.

First, in a case where the delivery completion notice is received from the physical distribution system 15, for example, in a case where the delivery completion is inputted from the shop terminal 11, for example, or in a case where the download completion notice is received from the download server 17, for example, the shop side processor 55 of the shop server 5 specifies the receipt number or control number that is an object of the sales determination from those notices or input. For example, if information on the delivery such as the delivery request number and the like is inputted into the order information DB 51, the order can be specified by the delivery request number included in the delivery completion notice. Therefore, the control number or receipt number can be extracted from the order information DB 51. Beside, it is possible to configure the delivery completion notice and the like so as to always include the control number or receipt number. Anyway, the receipt number or control number of the order that is an object of the sales determination is outputted from the shop side processor 55 to the command IF program 53 for the settlement server (step S171)

The command IF program 53 for the settlement server transmits the shop authentication information and the receipt number or control number to a sales determination processor of the settlement server 7 (step S173). The settlement server 7 carries out the shop authentication processing by using the shop authentication information (step S174). The shop authentication information is the shop ID and password, for example, and the settlement server 7 judges whether or not they are identical to the shop ID and password of the shop information registered in the shop information DB 73 in advance. In a case where the shop authentication is failed, the processing shifts to step S179. On the other hand, in a case where the shop authentication succeeded, the settlement server 7 specifies the order information in the settlement server 7 from the received receipt number or control number, and registers the sales determination for that order information (step S175). Incidentally, the control number or receipt number may be inputted incorrectly. Therefore, there is a case where the order information cannot be specified in the settlement server 7. In this case, the processing shifts to step S179.

Next, the settlement server 7 carries out the order price claim processing (step S177). The order price claim processing is a processing for writing the order information into a claim file 77 for the credit card company that carries out the settlement of that order, for example. For example, the claim file 77 is sent to the credit card company once a month. The credit card company charges the customer the price. Besides, the settlement server 7 registers information indicating the claim is completed, for that order in the settled order information DB 75.

When the processing is performed up to here, the settlement server 7 transmits the processing results of the steps S174 to S177 to the command IF program 53 for the settlement server (step S179). The command IF program 53 for the settlement server receives the processing results from the settlement server 7, and outputs them to the shop side processor 55 (step S181). In a case where it is indicated that the processing results succeeded, the shop side processor 55 registers the claim completion or the sales determination for the order information of the transmitted control number or the receipt number in the order information DB 51 (step S183). If it is indicated that the processing results were failed, it is possible that it outputs the processing results to the shop terminal 11, requests to confirm the receipt number or control number, and/or automatically tries again.

By doing so, the sales determination processing is completed. The price of the order for which the sales determination has been carried out is paid from the credit card company to the shop, and the credit card company charges the customer and receives the price from the customer.

As described above, one embodiment of this invention was explained. In the above, it is assumed that the customer is a member of an ISP, however it is also possible that a condition that he or she is a member of another group is adopted.

Besides, in this embodiment, the shop server 5 is configured so as to comprise the shop side processor 55 and the command IF program 53 for the settlement server. However, such division of the functions is arbitrary. The command IF program 53 for the settlement server may be divided into a plurality of function modules.

Further, as for the shop side processor 55 of the shop server 5 and the settlement server 7, it is possible that individual processors (for example, CGIs) are provided for each processing 1 to 6 described above, and it is also possible that the same processor (for example, CGI) performs those processing. A plurality of processors may be provided in each processing 1 to 6 described above to carry out the processing.

Furthermore, the shop server 5 may be physically implemented by a single computer, or by a plurality of computers. The settlement server 7 may have the same configuration.

What is claimed is:

1. An order processing method executed by a computer operable for a shop, said order processing method comprising:

receiving an order request including content information of a customer order from a customer terminal;

registering the received content information of said customer order into an order storage device, and transmitting at least identification information of said customer order and shop information to said customer terminal or said settlement system as a settlement request, in order to make said settlement system carry out a check for a customer of said customer terminal in response to said settlement request received from said computer operable for said shop or said customer terminal, said check being carried out without any involvement of said computer operable for said shop;

upon receiving said identification information of said customer order and a session key from said settlement system as a response to said settlement request, reading out said content information of said customer order from said order storage device relating to the received identification information of said customer order, and carrying out a stock confirmation processing of a commodity relating to said customer order, wherein said session key is data representing that said check for said customer of said customer terminal was successfully completed in said settlement system upon detecting, in said stock confirmation processing, that said commodity relating to said customer order is in stock, transmitting, as a request for a credit inquiry, said content information of said customer order that was read out from said order storage device, said session key to identify data stored in said settlement system, and shop authentication information to said settlement system; and upon receiving information indicating an acceptance of said customer order is possible from said settlement system as a response to said request for said credit inquiry, storing said information indicating an acceptance of the order for said customer order into said order storage device.

2. The order processing method as set forth in claim 1, wherein in said storing, identification information for said customer order in said settlement system is received from the settlement system and stored into said order storage device.

3. The order processing method as set forth in claim 1, wherein in said storing, information indicating whether or not the acceptance of said customer order is possible, is transmitted according to the information received from said settlement system, to said customer terminal.

4. The order processing method as set forth in claim 1, wherein in said storing, a processing for shipment of a commodity relating to said customer order is requested to a system associated with the shipment of said commodity, upon receiving said information indicating that the acceptance of said customer order is possible from said settlement system.

5. The order processing method as set forth in claim 1, wherein in said storing, information indicating that transmission of data relating to said customer order is allowed, is transmitted to a system associated with the transmission of said data, upon receiving said information indicating that the acceptance of said customer order is possible from said settlement system.

6. The order processing method as set forth in claim 1, wherein in said storing, a pickup request of a commodity relating to said customer order, is transmitted to a physical distribution system associated with shipment of said commodity, upon receiving said information indicating that the acceptance of said customer order is possible from said settlement system.

7. The order processing method as set forth in claim 1, further comprising:

transmitting said identification information of said customer order relating to an order price claim request to said settlement system at an arbitrary timing after shipment of a commodity relating to said customer order or provision of a service relating to said customer order, and receiving information indicating whether or not the order price claim processing succeeded, from said settlement system.

8. The order processing method as set forth in claim 1, wherein said information indicating the acceptance of said customer order is possible is settlement identification information for said customer order in said settlement system, and in said storing, said information indicating the acceptance of said customer order is possible and said settlement identification information are stored into said order storage device, and said order processing method further comprising:

transmitting said identification information of said customer order or said settlement identification information, which relates to an order price claim request, to said settlement system at an arbitrary timing after shipment of a commodity relating to said customer order or provision of a service relating to said customer order, and receiving information indicating whether or not the order price claim processing succeeded, from the settlement system.

9. The order processing method as set forth in claim 7, wherein in said transmitting said identification information of said customer order, authentication information of a shop relating to said order price claim request is further transmitted to said settlement system.

10. The order processing method as set forth in claim 7, wherein in said transmitting said identification information of said customer order, claim completion information is recorded so as to correspond to said customer order into said order storage device, upon receiving information indicating that the order price claim processing succeeded, from said settlement system.

11. The order processing method as set forth in claim 7, wherein said transmitting said identification information of said customer order is carried out in response to receiving a delivery completion notice from a system associated with the delivery of a commodity relating to said customer order.

* * * * *

UNITED STATES PATENT AND TRADEMARK OFFICE
CERTIFICATE OF CORRECTION

| | |
|---|---|
| PATENT NO. | : 7,310,611 B2 |
| APPLICATION NO. | : 10/292840 |
| DATED | : December 18, 2007 |
| INVENTOR(S) | : Akio Shibuya et al. |

It is certified that error appears in the above-identified patent and that said Letters Patent is hereby corrected as shown below:

Title Page, Column 2 (Foreign Patent Documents), Line 3, below "EP 0915590 5/1999" delete "EP 0915590 12/1999".

Column 21, Line 13, after "system" insert --;--.

Signed and Sealed this

First Day of July, 2008

JON W. DUDAS
*Director of the United States Patent and Trademark Office*